(12) United States Patent
Yamamoto

(10) Patent No.: US 6,411,706 B1
(45) Date of Patent: Jun. 25, 2002

(54) OFFICE CALL STATE DISPLAY SYSTEM

(75) Inventor: Takashi Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/317,135

(22) Filed: May 24, 1999

(30) Foreign Application Priority Data

May 29, 1998 (JP) .......................................... 10-150412

(51) Int. Cl.[7] .............................................. H04M 5/06
(52) U.S. Cl. .................. 379/265.03; 379/225; 379/219; 379/266.09
(58) Field of Search ....................... 379/265.03, 265.06, 379/219, 220.01, 225, 266.09

(56) References Cited

U.S. PATENT DOCUMENTS 5,465,286 A  * 11/1995  Clare et al. .................... 379/34
6,320,956 B1 * 11/2001  Cherry .................. 379/265.02

FOREIGN PATENT DOCUMENTS

| JP | 61-242149 | 10/1986 |
| JP | 5-22454 | 1/1993 |
| JP | 5-130229 | 5/1993 |
| JP | 6-327043 | 11/1994 |
| JP | 8-23378 | 1/1996 |

* cited by examiner

*Primary Examiner*—Ahmad F. Matar
*Assistant Examiner*—Rasha Al-Aubaidi
(74) *Attorney, Agent, or Firm*—Whitham, Curtis & Christofferson, P.C.

(57) ABSTRACT

An office call state display system includes a telephone exchange, first and second subscriber exchanges, and a display unit. First subscriber terminals are connected to the telephone exchange. Second subscriber terminals are connected to the second subscriber exchange. The first subscriber exchange is connected to the telephone exchange. The display unit is connected to the telephone exchange to display the call state of the first subscriber terminal and call states indicating busy, idle, and unmounted states of the extension telephone numbers assigned to the second subscriber terminals. The telephone exchange includes a control unit for sending, through the first subscriber terminal, a call state request signal including the representative extension telephone number and extension telephone number group information of the second subscriber terminal whose call state is to be known, and controlling the display unit on the basis of the call state information from the second subscriber exchange. The second subscriber exchange includes a signal control unit for returning call state information indicating a call state of each of the second subscriber terminals to the telephone exchange through the first subscriber exchange in response to the call state request signal from the telephone exchange.

9 Claims, 4 Drawing Sheets

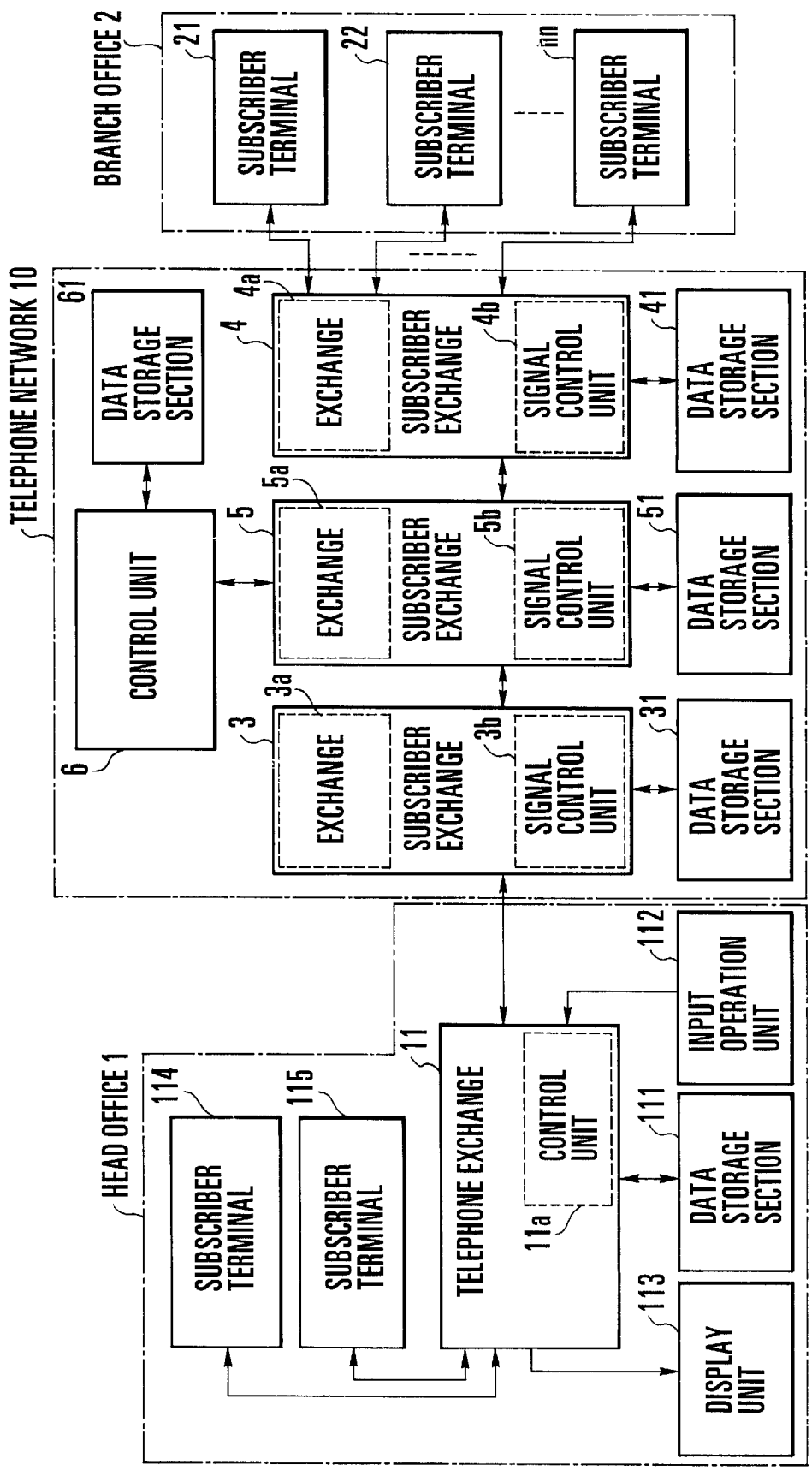
F I G. 1

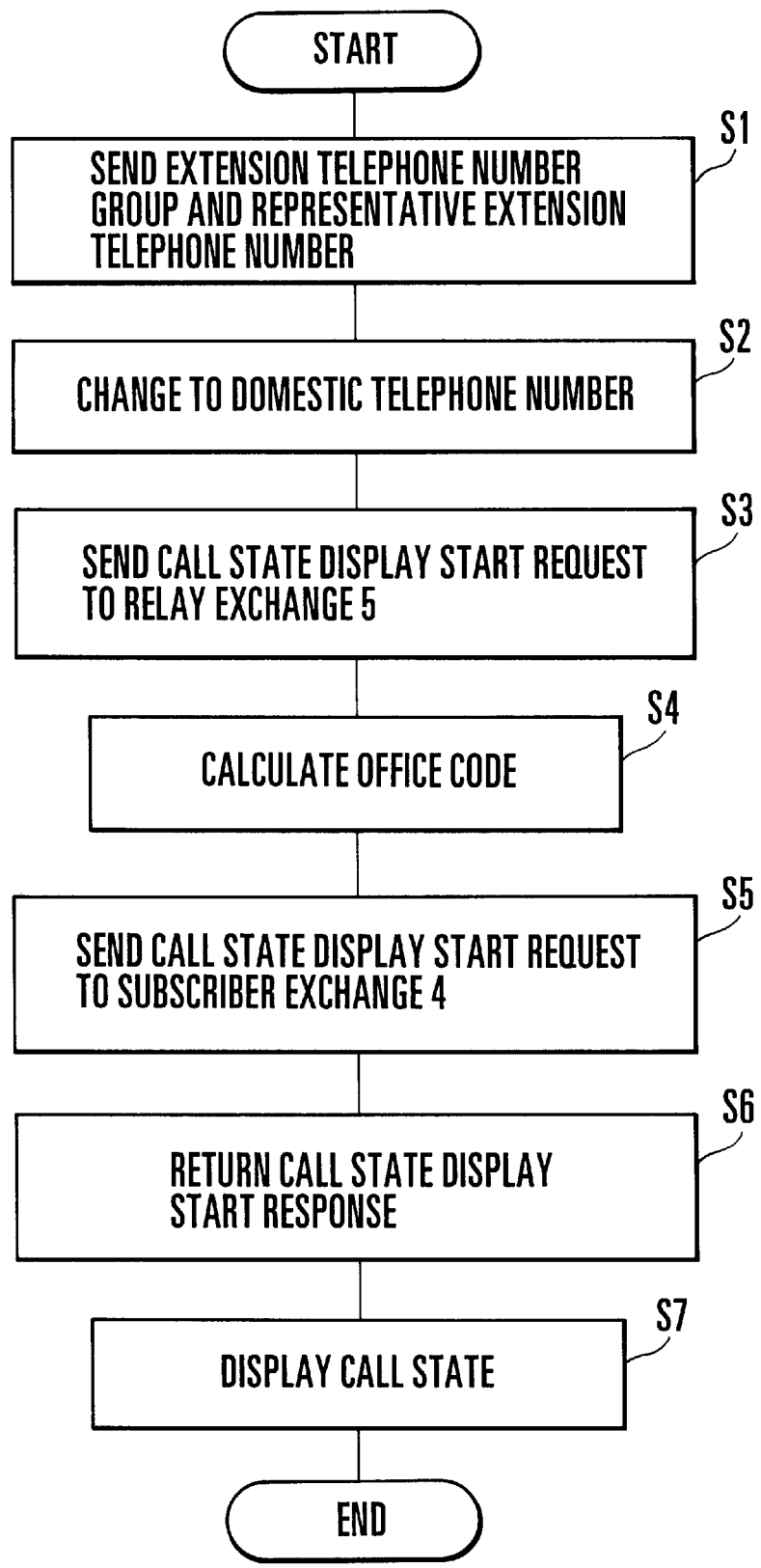
F I G. 2

OFFICE CALL STATE DISPLAY SYSTEM

BACKGROUND OF THE INVENTION

The present invention relates to an office call state display system for displaying the call state of each extension telephone number (extension telephone) on a switch board installed in a company or the like and, more particularly, to an office call state display system for displaying the call states of extension telephone numbers in branch offices connected to other exchanges by using the common channel signaling system No. 7 (complying with the CCITT) and executing a communication protocol based on the transaction capabilities application part (TCAP).

In a company using many telephone lines, a switch board (telephone exchange) including private branch exchanges is used to manually connect an incoming call of a representative telephone number to an extension telephone number (extension telephone). In addition, termination settings are switched by using a representative telephone number or dial-in operation. In addition, the telephone exchange performs processing of automatically connecting an incoming call of a representative extension telephone number to an extension telephone number (second number), i.e., automatic connection control, and outputs a speech announcement to request the input of an extension telephone number to a destination.

Such a telephone exchange is connected to a telephone network using an ISDN (Integrated Service Digital Network) to which the common channel signaling system No. 7 is applied. The telephone network based on the common channel signaling system No. 7 includes known signal transfer points and signal end offices. These signal transfer points and signal end offices include subscriber exchanges accommodating data communication units and telephones, relay exchanges for performing exchange among many subscriber exchanges, and the like. The subscriber exchanges and the relay exchanges execute programs for processing execution management, call processing, maintenance/operation, and fault processing based on the stored program control (SPC) scheme.

In general, a control unit (computer) is connected to the relay exchange. This control unit controls the overall telephone network to intensively manage, for example, fault data and execute the communication protocol (the general-purpose protocol for retrieval, registration, and change of control data, registration of the positions of terminals in mobile communication, registration of information between exchange maintenance/operation management centers, and data transfer for access operation between an exchange and a network database in information read operation or the like) based on the transaction capabilities application part (TCAP). The subscriber exchanges and the relay exchanges comprise exchanges and signal control units. The exchanges are connected to each other through trunk lines based on the inter-office signaling system, and the signal control units are connected to each other through a common line.

Each exchange performs relay control as well as subscriber control and communication channel switching. Each signal control unit sends inter-office signals to execute programs for processing execution management, call processing, maintenance/operation, and fault processing based on the stored program control scheme. The telephone exchange connected to such a telephone network displays call states such as the busy and idle states of the connected subscriber terminals (telephones and data communication units).

Display of such call states is executed by each signal control unit, which stores extension telephone numbers (second numbers) input upon termination of representative extension telephone numbers in the main memory or the like, according to the following control sequence.

First of all, the telephone exchange periodically (e.g., 6-sec intervals) transmits a call state display request signal including extension telephone number group information to the subscriber exchange that accommodates the telephone exchange. The subscriber exchange reads out call states corresponding to the telephone number group of the extension telephones connected to the telephone exchange from the main memory, and returns this call state display response information to the telephone exchange. The telephone exchange displays the call state of each extension telephone number by blinking the corresponding lamp or on a cathode-ray tube (CRT) or the like on the basis of the returned call state display response information, thereby displaying the call state of each extension telephone.

"Representative Selection System" disclosed in Japanese Patent Laid-Open No. 8-23378 is an proposal associated with display of such call states. In this prior art, upon termination to a representative telephone number, the extension telephone numbers and user names of the extension telephones belonging to this representative telephone number are displayed on the screen of each extension telephone. This prevents a specific extension telephone from responding to an incoming call to an unspecified number of extension telephones.

In the above prior art, the telephone exchange installed in a head office cannot display the call states of extension telephone numbers in a branch office or the like which is connected to another exchange and belongs to the same corporated body. The users in the head office cannot therefore know the call states of the extension telephone numbers in the branch office.

In addition, when the telephone exchange installed in the head office executes a control sequence to display the call state of connected extension telephones (extension telephone numbers), the loads of processing on the telephone exchange and subscriber exchanges are heavy.

SUMMARY OF THE INVENTION

It is an object of the present invention to provide an office call state display system which allows a grouped second telephone exchange to monitor the call states of extension telephone numbers in a first telephone exchange.

It is another object of the present invention to provide an office call state display system which can transmit a display signal representing the call state of an extension telephone number whose call state has changed (busy, idle, or unmounted state) and reduce the load on telephone exchanges and subscriber exchanges.

In order to achieve the above objects, according to the present invention, there is provided an office call state display system comprising a telephone exchange to which at least one first subscriber terminal is connected, a first subscriber exchange to which the telephone exchange is connected, a second subscriber exchange to which a plurality of second subscriber terminals to which extension telephone numbers designated by a common representative extension telephone number and an extension telephone number group are assigned are connected, and display means, connected to the telephone exchange, for displaying a call state of the first subscriber terminal and call states indicating busy, idle, and unmounted states of the extension telephone numbers assigned to the second subscriber terminals, the telephone exchange comprising first control means for sending, through the first subscriber terminal, a call state request signal including the representative extension telephone number and extension telephone number group information of the second subscriber terminal whose call state is to be known, and controlling the display means on the basis of the call state information from the second subscriber exchange, and the second subscriber exchange comprising second control means for returning call state information indicating a call state of each of the second subscriber terminals to the telephone exchange through the first subscriber exchange in response to the call state request signal from the telephone exchange.

BRIEF DESCRIPTION OF THE DRAWINGS

FIG. 1 is a block diagram showing an office call state display system according to an embodiment of the present invention;

FIG. 2 is a flow chart showing a procedure for start operation in the system in FIG. 1;

DESCRIPTION OF THE PREFERRED EMBODIMENT

Figure 3:
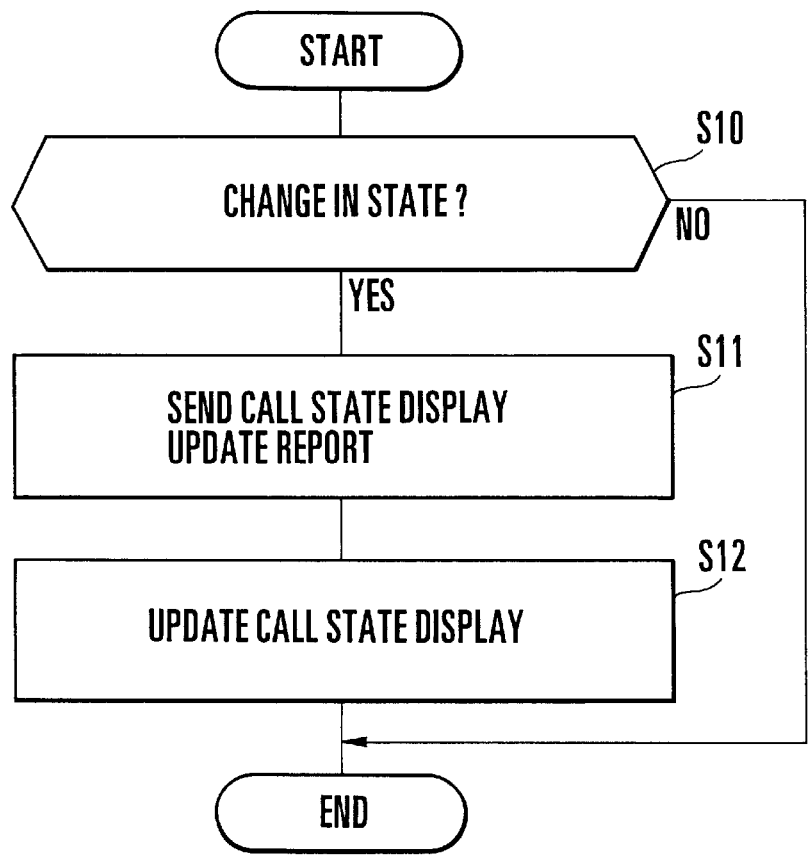
FIG. 3 is a flow chart showing a procedure for periodic operation in the system in FIG. 1.

The present invention will be described in detail below with reference to the accompanying drawings.

FIG. 1 shows an office call state display system according to an embodiment of the present invention. A case wherein a head office 1 and a branch office 2 belong to the same corporated body will be described. Referring to FIG. 1, the office call state display system includes a telephone exchange (switch board) 11 that is installed in the head office 1 to display the call states of the extension telephone numbers assigned to the extension telephones in the head office 1 and the call states of the extension telephone numbers assigned to the extension telephones in the branch office 2 of the same corporated body.

This telephone exchange 11 includes a control unit 11a for performing control to perform exchange processing for extension telephones in the head office 1 and display the call states of the extension telephone numbers assigned to the extension telephones in the branch office 2. A data storage section 111 storing control programs for executing control operations, an input operation unit 112, a display unit 113, and a plurality of subscriber terminals 114 and 115 are connected to the control unit 11a.

The data storage section 111 is constituted by, for example, a hard disk unit and a magnetic tape unit, which store control programs and data that are used to perform the following control operations I, II, and III executed by a communication protocol based on TCAP corresponding to the present invention.

I. Control operation of displaying the call states of the extension telephone numbers in the head office 1 and branch office 2.

II. Control operation of transmitting only a signal representing an extension telephone number exhibiting a change in call state from the busy state to the idle state (or from the idle state to the busy state) after display of the call state, thereby updating the call state.

III. Control operation of changing an extension telephone number list by transmitting an extension telephone number exhibiting a change in call state to the unmounted state upon removal of the corresponding extension telephone (extension telephone number).

These control operations will be referred to as control executed based on the communication protocol in the present invention.

The input operation unit 112 is used to designate display of the call states of extension telephone numbers and input an extension telephone number group and a representative extension telephone number in order to request this display operation. The display unit 113 displays the call states (busy or idle) of the extension telephone numbers in the head office 1 and branch office 2 by blinking lamps. Note that a cathode-ray tube (CRT) may be used for this display operation. The subscriber terminals 114 and 115 are extension telephones or data communication units to which extension telephone numbers are assigned.

The office call state display system is comprised of a subscriber exchange 3 to which the telephone exchange 11 is connected, a subscriber exchange 4 to which subscriber terminals 21, 22, . . . , nn in the branch office 2 are connected, a relay exchange 5 for performing relay exchange between the subscriber exchanges 3 and 4, a control unit 6 constituted by a computer, a data storage section 31 connected to the subscriber exchange 3, a data storage section 41 connected to the subscriber exchange 4, a data storage section 51 connected to the relay exchange 5, and a data storage section 61 connected to the control unit 6. These components constitute a telephone network 10.

The data storage section 31 stores control programs for executing control based on the communication protocol in the present invention, performs working processing, and also stores the call states (busy and idle states) of the subscriber terminals 114 and 115 connected to the telephone exchange 11. The data storage section 41 stores control programs for executing control based on the communication protocol in the present invention, performs working processing, and also stores the call states of the subscriber terminals 21, 22, . . . , nn. The data storage section 51 stores control programs for executing control based on the communication protocol in the present invention and performs working processing.

The control unit 6 controls the overall telephone network 10 to intensively manage, for example, fault data and execute the communication protocol based on the transaction capabilities application part (the general-purpose protocol for retrieval, registration, and change of control data, registration of the positions of terminals in mobile communication, registration of information between exchange maintenance/operation management centers, and data transfer for access operation between an exchange and a network database in information read operation or the like). The data storage section 61 stores control programs executed by the control unit 6 to control the overall telephone network 10.

The subscriber exchanges 3 and 4 and the relay exchange 5 have versatile arrangements respectively having exchanges 3a, 4a, and 5a and signal control units 3b, 4b, and 5b. These exchanges are connected to a telephone network such as an ISDN network to which the common channel signaling system No. 7 is applied. The subscriber terminals 21, 22, . . . , nn and the subscriber terminals 114 and 115, which are data communication units or extension telephones, are connected to the exchanges 3a, 4a, and 5a. The exchanges 3a, 4a, and 5a are connected to the other exchanges in the subscriber and relay exchanges 3, 4, and 5 through a trunk line (communication line) based on the inter-office signaling system to perform communication channel switching control. These exchanges 3a, 4a, and 5a are generally constituted by subscriber circuits, switch circuits, and trunk circuits.

The signal control units 3b, 4b, and 5b for respectively controlling the exchanges 3a, 4a, and 5a are connected to the other signal control units in the subscriber and relay exchanges 3, 4, and 5 through a common line.

The operation of the office call state display system having the above arrangement will be described next.

The signal control units 3b, 4b, and 5b in the subscriber exchanges 3 and 4 and relay exchange 5 transmit inter-office signals through the common line to execute the following control programs indicated by A), B), C), and D) based on the known stored program control (SPC) scheme:

A) processing execution management (execution of scheduling for real-time processing);

B) call processing (execution of control on exchange processing);

C) maintenance/operation (execution of man-machine interface in maintenance); and D) detachment/attachment of a faulty unit from/to the operation system.

By executing these control programs, the signal control units 3b, 4b, and 5b monitors the states of communication lines or subscriber lines with respect to the subscriber and trunk circuits in the exchanges 3a, 4b, and 5a in the subscriber exchanges 3 and 4 and relay exchange 5, and perform control operations corresponding to detection of connection and disconnection requests. In addition, the signal control units execute switch control for the switch circuits, i.e., ON/OFF control on communication line switches and communication channel exchange control. Furthermore, the signal control units perform control to transmit/receive dial signals (selection signals) exchanged with the other signal control units through the common line to/from the subscriber terminals 21, 22, . . . , nn, the subscriber terminals 114 and 115, and the subscriber exchanges 3 and 4 and the relay exchange 5.

The signal control units also perform various service control operations, control service control fault processing of detaching faulty units and recombining connections for normal operation, and perform translation control to identify connection destinations by analyzing dial signals. Moreover, the signal control units execute subscriber control for the subscriber terminals 21, 22, . . . , nn and the subscriber terminals 114 and 115, and execute line control for trunk circuits accommodating communication lines.

Control on the communication protocol in the present invention will be described next.

Referring to FIG. 1, the head office 1 and the branch office 2 belong to the same corporated body, and the extension telephone number "302" is assigned to the telephone exchange 11 in the head office 1. The control unit 11a of the telephone exchange 11 executes an exchange control program (installing, e.g., Windows OS). The control unit 11a executes the communication protocol based on the transaction capabilities application part corresponding to the present invention and indicated by I, II, and III described above.

The extension telephone numbers "405" (representative extension telephone number), "452", and "422" are respectively assigned to the subscriber terminals 21, 22, . . . , nn in the branch office 2.

The telephone exchange 11 reads out a control program for executing control based on the communication protocol in the present invention from the data storage section 111 in accordance with the name of the corporated body to which the head office 1 and the branch office 2 belong and the representative extension telephone number "405". The control unit 6 executes control based on the communication protocol in the present invention in accordance with the toll numbers and local office numbers of domestic telephone numbers of the subscriber lines connected to the subscriber exchanges 3 and 4 and office codes to which the subscriber lines are connected. These data are read out from the data storage section 51.

The control unit 6 executes the following control based on the communication protocol in the present invention in accordance with the extension telephone numbers and domestic telephone numbers of the subscriber lines connected to the subscriber exchanges 3 and 4, which are read out from the data storage section 61.

Call state display operation will be described next with reference to the flow chart of FIG. 2.

Referring to FIG. 2, the telephone exchange 11 in the head office 1 originates a call by designating the extension telephone number group "450" and the representative extension telephone number "405" of the branch office 2 (step S1). For example, the extension telephone number group is constituted by a numeral equal to or more than the lower third digit of the extension telephone number, a numeral equal to or more than the second digit (0 or 5), and the lower first digit (fixed to 0).

If, for example, "400" is designated as an extension telephone number group, it indicates the extension telephone numbers "400" to "449". If "450" is designated as an extension telephone number group, it indicates the extension telephone numbers "450" to "499" v.

When the subscriber exchange 3 receives the incoming call originated from the telephone exchange 11 and constituted by the extension telephone number group "450" and the representative extension telephone number "405" of the branch office 2, the signal control unit 3b of the subscriber exchange 3 outputs this incoming call to the relay exchange 5. The control unit 6 receives the incoming call through the signal control unit 5b of the relay exchange 5 and converts the representative extension telephone number of the incoming call into a domestic telephone number based on the domestic telephone number plan (step S2). The control unit 6 converts the representative extension telephone number "405" of the branch office 2 into, e.g., "012-345-6789", and returns it to the subscriber exchange 3.

When the signal control unit 3b of the subscriber exchange 3 outputs a call state display start request (TCAP conversation processing start message) to the relay exchange 5 (step S3), the control unit 6 discriminates an office code (subscriber exchange 4) on the basis of the domestic telephone number "012-345-6789" (step S4). The control unit 6 sends the call state display start request (TCAP conversation processing start message) based on the transaction capabilities application part (TCAP) and including the extension telephone number group "450" to the subscriber exchange 4 through the relay exchange 5 (step S5).

The signal control unit 4b of the subscriber exchange 4 discriminates the branch office 2 from the domestic telephone number "012-345-6789" and reads out the call states of 50 extension telephone numbers corresponding to the extension telephone number group "450" from the data storage section 41. The signal control unit 4b of the subscriber exchange 4 stores the call states of the 50 extension telephone numbers as call state display start response (transaction capabilities application part (TCAP)) information, and sends it as a call state display start response (TCAP conversation processing continuation message) to the subscriber exchange 3 through the relay exchange 5 (step S6).

The signal control unit 3b of the subscriber exchange 3 sends the call state information on the extension telephone numbers "450" to "499" to the telephone exchange 11. The control unit 11a of the telephone exchange 11 displays the call states of the extension telephone numbers "450" to "499" (corresponding to the subscriber terminals 21, 22, ..., nn in the branch office 2) on the display unit 113 on the basis of the received call state information (step S7).

Operation to be performed when a call state changes (to the busy or idle state) will be described next with reference to the flow chart of FIG. 3.

Assume that subscriber terminal 22 in the branch office 2 generates a communication request to the subscriber terminal nn, and a communication line is connected between the subscriber terminals 22 and nn. Referring to FIG. 3, the signal control unit 4b of the subscriber exchange 4 executes control based on the communication protocol in the present invention, and searches the data storage section 41 at, e.g., two-second intervals to check a change in call state (step S10). With this operation, a change in the call state of the subscriber terminal 22 from "idle" to "busy" is detected.

The signal control unit 4b of the subscriber exchange 4 sends a call state display change report (TCAP conversation processing relay message) including flags indicating the call states of the 50 extension telephone numbers "450" to "499" and the presence/absence of call state changes to the subscriber exchange 3 through the relay exchange 5 (step S11).

The flags indicating the call states of the 50 extension telephone numbers and the presence/absence of call state changes are sent with only the flag corresponding to the extension telephone number of the subscriber terminal 22 being set. Upon reception of the call state display change report (TCAP conversation processing continuation message) from the subscriber exchange 3, the signal control unit 3b of the subscriber exchange 3 executes control based on the communication protocol in the present invention, and sends flags indicating the call states of the 50 extension telephone numbers and the presence/absence of call state changes to the telephone exchange 11.

The control unit 11a of the telephone exchange 11 updates only the information indicating the call state displayed on the display unit 113 which corresponds to the extension telephone number "452" for which the flag indicating the call state and the presence/absence of a call state change is set (step S12).

End operation based on the communication protocol will be described with reference to the flow chart of FIG. 4.

Figure 4:
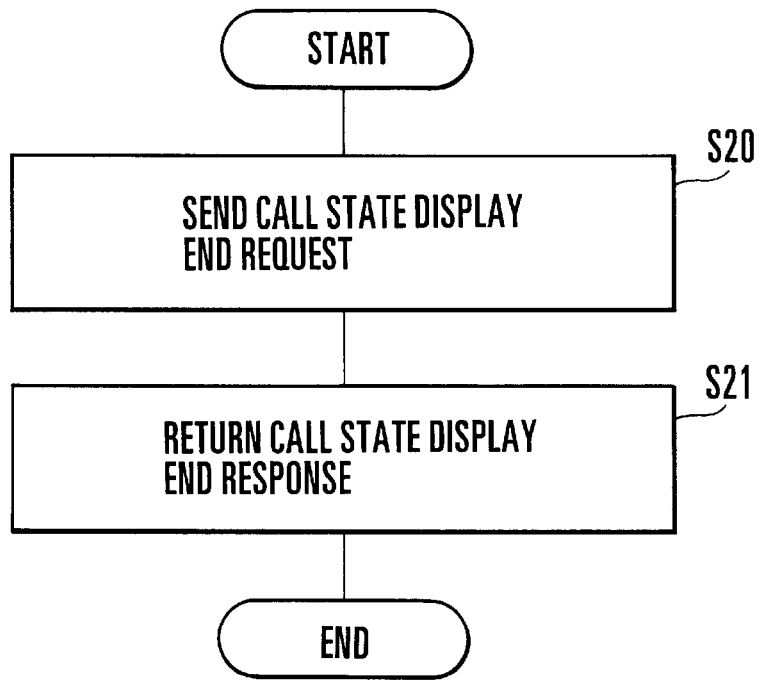
FIG. 4 is a flow chart showing a procedure for end operation in the system in FIG. 1.

Referring to FIG. 4, when the control unit 11a of the telephone exchange 11 designates a call state display end, a call state display end request is sent to the subscriber exchange 3 (step S21). The signal control unit 3b of the subscriber exchange 3 executes control based on the communication protocol in the present invention to send the call state display end request (TCAP conversation processing continuation message) to the subscriber exchange 4 through the relay exchange 5. Upon reception of the call state display end request (TCAP conversion processing continuation message), the signal control unit 4b of the subscriber exchange 4 returns a call state display end response (TCAP conversion processing end message) to the subscriber exchange 3 through the relay exchange 5, thus ending the control (step S22).

Operation to be performed when the call state of the extension telephone number changes to the unmounted state upon removal of the corresponding one of the subscriber units 21 to nn will be described next with reference to the flow chart of FIG. 5.

Figure 5:
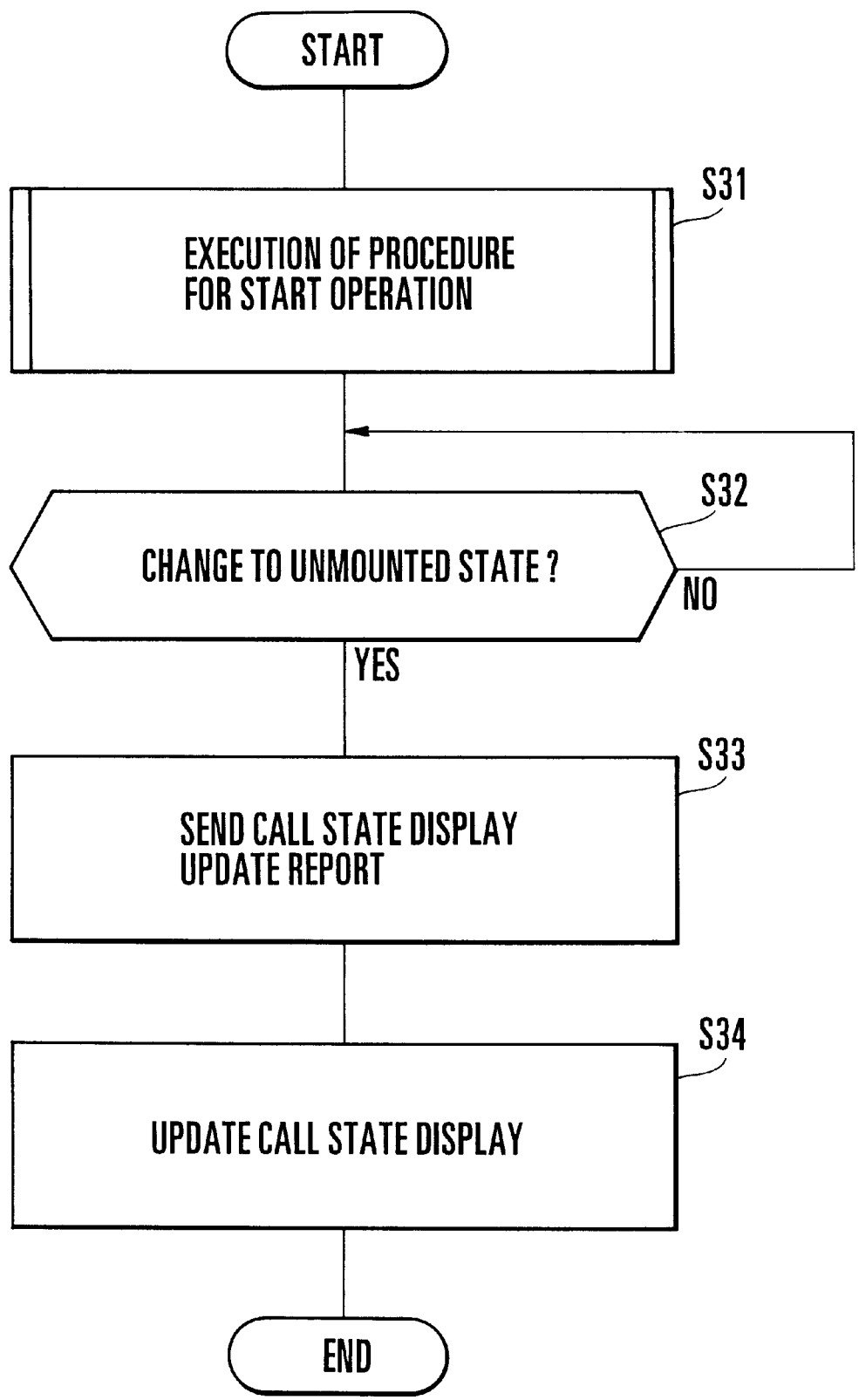
FIG. 5 is a flow chart showing a procedure for processing to be performed when the call state of a extension telephone number changes to the unmounted state in the system in FIG. 1.

Referring to FIG. 5, the procedure for start operation in FIG. 2 is executed (step S31). The telephone exchange 11 in the head office 1 originates a call by designating the extension telephone number group "450" and the representative extension telephone number "405" of the branch office 2. In response to this, the control unit 11a of the telephone exchange 11 displays the call states of the extension telephone numbers "450" to "499" (corresponding to the subscriber terminals 21, 22, ..., nn in the branch office 2) on the display unit 113.

The signal control unit 4b of the subscriber exchange 4 executes control based on the communication protocol in the present invention to check whether the subscriber terminal 21 is detached and the call state of the extension telephone number has changed to the unmounted state (registration cancellation) (step S32). If the signal control unit 4b of the subscriber exchange 4 detects that the call state has changed from the idle state to the unmounted state, the signal control unit 4b sends a call state display change report (TCAP conversation processing continuation message) including flags indicating the call states of the 50 extension telephone numbers "450" to "499" and the presence/absence of call state changes to the subscriber exchange 3 through the relay exchange 5 (step S33) as in steps S11 and S12 in FIG. 3.

In this case, the flags indicating the call states of the 50 extension telephone numbers and the presence/absence of call state changes are sent with only the flag corresponding to the extension telephone number of the subscriber terminal 22 being set. Upon reception of the call state display change report (TCAP conversation processing continuation message), the signal control unit 3b of the subscriber exchange 3 executes control based on the communication protocol in the present invention to send the flags indicating the call states of the 50 extension telephone numbers and the presence/absence of call state changes to the telephone exchange 11. The control unit 11a of the telephone exchange 11 updates only the information indicating the call state displayed on the display unit 113 which corresponds to the extension telephone number "452" for which the flag indicating the call state and the presence/absence of a call state change is set (step S34).

In this embodiment, the call states of only the subscriber terminals 21, 22, ..., nn in the branch office 2 are displayed. In practice, however, a plurality of subscriber exchanges are connected to the relay exchange 5. When the subscriber terminals 21, 22, ..., nn are connected to each of the plurality of subscriber exchanges 4, the telephone exchange 11 can display the call states of the subscriber terminals connected to each of the subscriber exchanges. In this case, the plurality of subscriber exchanges in the branch office 2 may be designated to perform transmission as in the case of the representative extension telephone number "405" in the branch office 2.

In addition, in the above embodiment, the signal control unit 5b and the control unit 6 are separately prepared, but may be replaced with a common control unit.

As is obvious from the above description, according to the office call state display system of the present invention, on the basis of a call state display request signal including a representative extension telephone number and extension telephone number group information and sent from a telephone exchange to one subscriber exchange, the other subscriber exchange sends a call state display change report indicating the call state (busy, idle, or unmounted state) of each extension telephone number (extension telephone) accommodated therein. The telephone exchange displays the call states based on this call state display change report.

As a consequence, the telephone exchange installed in the head office or the like can display the call states of the extension telephone numbers (extension telephones) in a branch office belonging to the same corporated body, which are connected to the other exchange office (subscriber exchange), thereby allowing the user to monitor the call states of the respective extension telephone numbers.

In addition, according to the office call state display system, the other subscriber exchange sends only a display signal representing an extension telephone number whose call state has changed, and the telephone exchange displays this change in call state. As a consequence, the load on the telephone exchange and the subscriber exchange can be reduced as compared with the case in which all changes in call state to the busy and idle states are displayed.

Furthermore, according to the office call state display system of the present invention, the other subscriber exchange sends only a display signal indicating a change in the call state of the extension telephone number to the unmounted state upon removal of the subscriber terminal, and the telephone exchange displays this change to the unmounted state. As a result, the load on the telephone exchange and the subscriber exchange can be reduced as compared with the case in which information indicating all changes in call states including a change to the unmounted state are sent and displayed.

What is claimed is:

1. An office call state display system comprising:
   a telephone exchange to which at least one first subscriber terminal is connected;
   a first subscriber exchange to which said telephone exchange is connected;
   a second subscriber exchange to which a plurality of second subscriber terminals to which extension telephone numbers designated by a common representative extension telephone number and an extension telephone number group are assigned are connected; and
   display means, connected to said telephone exchange, for displaying a call state of said first subscriber terminal and call states indicating busy, idle, and unmounted states of the extension telephone numbers assigned to said second subscriber terminals,
   said telephone exchange comprising first control means for sending, through said first subscriber terminal, a call state request signal including the representative extension telephone number and extension telephone number group information of said second subscriber terminal whose call state is to be known, and controlling said display means on the basis of the call state information from said second subscriber exchange, and
   said second subscriber exchange comprising second control means for returning call state information indicating a call state of each of said second subscriber terminals to said telephone exchange through said first subscriber exchange in response to the call state request signal from said telephone exchange.

2. A system according to claim 1, wherein said second control means sends a call state signal representing an extension telephone number assigned to said second subscriber terminal whose call state has changed to said telephone exchange, and
   said first control means displays the change in the call state of said second subscriber terminal on the basis of the call state signal from said second control means.

3. A system according to claim 1, wherein said second control means sends an assignment state signal representing a change in an assignment state of a extension telephone number upon addition/removal of said second subscriber terminal, and
   said first control means displays a change in a mounted state of said second subscriber terminal on the basis of the assignment state signal from said second control means.

4. A system according to claim 1, further comprising a relay exchange for performing relay exchange between said first and second subscriber exchanges.

5. A system according to claim 4, wherein said relay exchange outputs an incoming call to said second subscriber exchange designated by converting a representative extension telephone number sent from said telephone exchange into a domestic telephone number based on a domestic telephone number plan, and said second subscriber exchange outputs a call state display change notification indicating a call state of an extension telephone number assigned to said second subscriber exchange to said telephone exchange in response to the incoming call from said relay exchange.

6. A system according to claim 4, wherein each of said first and second subscriber exchanges and said relay exchange comprises an exchange, a signal control unit including said second control means, and a data storage unit,
   said data storage unit stores a control program in advance, and
   said signal control unit executes a communication protocol for control on display of a call state of an extension telephone number, control on display of a changed call state, and control on display of a change to an unmounted state of said second subscriber terminal in accordance with the control program stored in said data storage unit.

7. A system according to claim 6, wherein said first and second subscriber exchanges and said relay exchange are connected to each other through a trunk line based on an inter-office signaling system, and
   said signal control units are connected to each other through a common line.

8. A system according to claim 1, further comprising:
   signal input means, connected to said telephone exchange, for inputting a call state request signal; and
   first storage means, connected to said telephone exchange, for storing a control program for performing control on display of a call state of an extension telephone number, control on updating of only a changed call state, and control on display of a change to an unmounted state of said second subscriber terminal in accordance with an executed communication protocol.

9. A system according to claim 1, wherein said first control means displays a call state of an extension telephone number assigned to said second subscriber terminal by executing a communication protocol based on the transaction capabilities application part (TCAP).

* * * * *